United States Patent [19]

Ellis

[11] Patent Number: 4,969,724
[45] Date of Patent: Nov. 13, 1990

[54] HELMET SUPPORTED OPTICAL SYSTEMS WITH FOUR REFLECTIONS

[75] Inventor: Stafford M. Ellis, East Preston, England

[73] Assignee: Gec-Marconi Limited, England

[21] Appl. No.: 426,734

[22] Filed: Oct. 24, 1989

[30] Foreign Application Priority Data

Oct. 27, 1988 [GB] United Kingdom ................. 8825204

[51] Int. Cl.$^5$ ...................... G02B 23/06; G02B 23/10; G02B 27/10; G02B 23/12
[52] U.S. Cl. .................................. 350/503; 350/538; 350/174
[58] Field of Search ............... 350/174, 503, 538, 602, 350/618, 622

[56] References Cited

U.S. PATENT DOCUMENTS

| 4,468,401 | 8/1984 | Ellis | 350/174 |
| 4,563,061 | 1/1986 | Ellis | 350/174 |
| 4,902,116 | 2/1990 | Ellis | 350/174 |

*Primary Examiner*—Jon W. Henry
*Attorney, Agent, or Firm*—Kirchstein, Ottinger, Israel & Schiffmiller

[57] ABSTRACT

A helmet supported optical system which provides an eye of a wearer (11 or 49) of a helmet (7 or 35) with a direct view of the scene forward of the wearer (11 or 49) on which is superimposed collimated optical imagery. The system comprises: an eyepiece (1 or 47a, 47b); means (5 or 37a, 37b, 39a, 39b, 41a, 41b, 43a, 43b) operable to develop a bright data representation at a plane (31 or 44a, 44b) substantially congruent with the principal focal plane of an element (21 or 46a, 46b) of the eyepiece (1 or 47a, 47b); and, disposed between the means (5 or 37a, 37b, 39a, 39b, 41a, 41b, 43a, 43b) operable and the eyepiece (1or 47a, 47b), a body (3 or 45a, 45b) of light refractive material.

The system has a configuration which facilitates improvement in respect of all up weight and/or moments of the system about the helmet wearer's (11 or 49) neck pivot position vis-à-vis known helmet supported optical systems, as above which do not include the body (3 or 45a, 45b) of light refractive material disposed between the means operable (5 or 37a, 37b, 39a, 39b, 41a, 41b, 43a, 43b) and the eyepiece (1 or 47a, 47b).

6 Claims, 3 Drawing Sheets

HELMET SUPPORTED OPTICAL SYSTEMS WITH FOUR REFLECTIONS

This invention relates to helmet supported optical systems.

More particularly the invention relates to such systems of the kind which provide an eye of a wearer of a helmet with a direct view of the scene forward of the wearer on which is superimposed collimated optical imagery, and comprise: an eyepiece comprising a body of light refractive material, supported with respect to the helmet in front of a position for said eye defined with respect to helmet axes, having: a light input face; a boundary surface opposite said input face; substantially flat and parallel fore and aft faces; and, internally of said body bridging the space between said input face and said boundary surface, an aerially extensive region concavely curved towards said aft face and possessing both light reflective and light transmissve properties; and means supported with respect to the helmet operable to develop a bright data representation at a plane substantially congruent with the principal focal plane of said aerially extensive region and defined with respect to said input face of the eyepiece such that light from said bright data representation developed at said plane entering said eyepiece at said input face is: internally reflected forwardly towards said aerially extensive region; partially reflected by said aerially extensive region rearwardly towards said aft face; and transmitted through said aft face to the said position for said eye.

Helmet supported optical systems of the above kind are disclosed in GB-A-2108702 and GB-A-2144558.

It is an object of the present invention to provide a helmet supported optical system of the above kind having a configuration which facilitates improvement in respect of all up weight and/or moments of the system about the helmet wearer's neck pivot position.

According to the present invention there is provided a helmet supported optical system which provides an eye of a wearer of a helmet with a direct view of the scene forward of the wearer on which is superimposed collimated optical imagery, said system comprising: an eyepiece comprising a body of light refractive material, supported with respect to the helmet in front of a position for said eye defined with respect to helmet axes, having: a light input face; a boundary surface opposite said input face; substantially flat and parallel fore and aft faces; and, internally of said body bridging the space between said input face and said boundary surface, an aerially extensive region concavely curved towards said aft face and possessing both light reflective and light transmissve properties; and means supported with respect to the helmet operable to develop a bright data representation at a plane substantially congruent with the principal focal plane of said aerially extensive region and defined with respect to said input face of the eyepiece such that light from said bright data representation developed at said plane entering said eyepiece at said input face is: internally reflected forwardly towards said aerially extensive region; partially reflected by said aerially extensive region rearwardly towards said aft face; and transmitted through said aft face to the said position for said eye, wherein between said means operable to develop said bright data representation and said input face of the eyepiece, there is a second body of light refractive material having: a first face by way of which light from said bright data representation can enter said second body; a second face having a mirror coating; and a third face confronting said input face of the eyepiece, the conformation of said second body of light refractive material being such that rays from said bright data representation entering said second body at said first face are: reflected at the mirror coating on said second face back to the said first face such that they are incident on said first face at angles greater than the critical angle of said second body to air; are totally internally reflected at said first face to said third face; and transmitted through said third face to said input face of the eyepiece.

In one embodiment of the invention said means operable to develop said bright data representation comprises a cathode ray tube, the plane at which said bright data representation is developed being at the output face of said cathode ray tube.

In another embodiment of the invention said means operable to develop said bright data representation comprises: a forward looking object lens; an image intensifier; and, defining the optical path from said lens to an input face of said intensifier, an amici prism, the system being such that a collimated intensified image of said scene forward of the wearer is presented to said eye of the wearer in register with said direct view through said eyepiece, said plane being at an output face of said image intensifier.

Two helmet supported optical systems in accordance with the present invention will now be described, by way of example, with reference to the accompanying drawings, in which.

Figure 3:
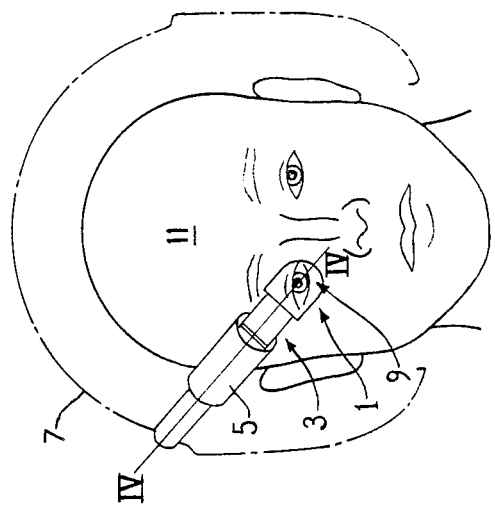
FIG. 3 is a diagrammatic front elevation of the system of FIG. 1.
Figure 1:
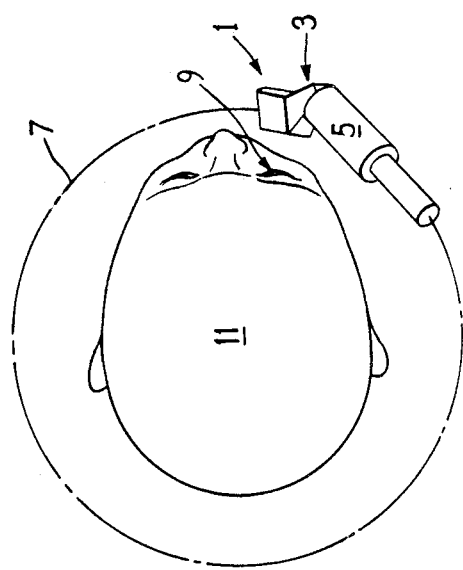
FIG. 1 is a diagrammatic plan view of the first system.
Figure 2:
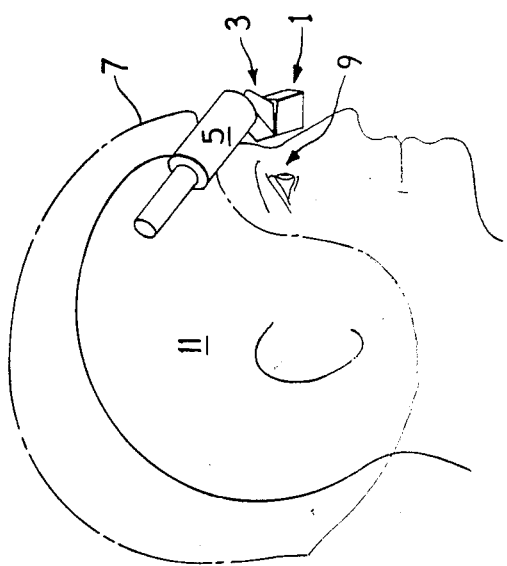
FIG. 2 is a diagrammatic side elevation of the system of FIG. 1.
Figure 4:
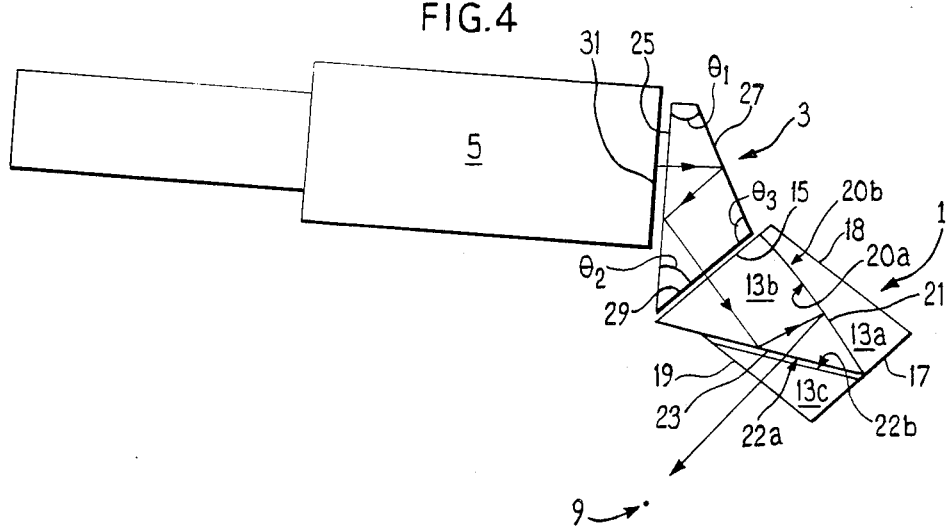
FIG. 4 is an enlarged cross-section of the first system on the line IV—IV in FIG. 3.

Referring to FIGS. 1 to 4, the first system comprises an eyepiece 1, a glass body 3 and a cathode ray tube 5, supported by means (not shown) on a helmet 7. The eyepiece 1 is supported in front of a position 9 for an eye of a wearer 11 of the helmet 7, defined with respect to axes of the helmet 7.

The eyepiece 1 comprises a three part 13a,13b,13c composite glass body having a light input face 15, a boundary surface 17 opposite the input face 15, and essentially flat and parallel fore 18 and aft 19 faces. At confronting faces 20a,20b of the parts 13a,13b is an aerially extensive region constituted by an optical coating 21 on one of the faces 20a,20b possessing both light transmissive and light reflective properties. The faces 20a,20b and hence optical coating 21 are concavely, specifically substantially spherically, curved towards the aft face 19. The coating 21 can be a neutral density coating or preferably a dichroic filter coating or even a diffractive coating. The parts 13a,13b are united by optical cement. The confronting faces 22a,22b, of the parts 13b,13c, are separated by a very small air space 23.

The glass body 3 has a first face 25 by way of which can enter the body 3, a second face 27 having a mirror coating and a third face 29. The second 27 and third 29 faces are inclined at acute angles $\theta_1$ and $\theta_2$ respectively to the first face 25 and at an obtuse angle $\theta_3$ to one another.

The cathode ray tube 5 has a flat output face 31.

The third face 29 of the glass body 3 is positioned parallel to and in close proximity with the light input face 15 of the eyepiece 1 and the first face 25 of the glass body 3 is positioned parallel to and in close proximity with the output face 31 of the cathode ray tube 5.

The system is such that the output face 31 of the cathode ray tube 5 is congruent with the principal focal plane of the coating 21.

The operation of the system is as follows.

The wearer 11 directly views a distant forward scene through the eye piece 1.

The cathode ray tube 5 develops a bright data representation at its output face 31 and light therefrom is incident on and passes through the first face 25 of the glass body 3 so as to be incident on and reflected by the mirror coating of the second face 27 so as to be incident again on the first face 25. The angles of reflection of the light from the second face 27 are such that the angles of incidence of the light on the first face 25 are greater than the air/glass critical angle, so that the light is totally internally reflected at the first face 25 so as to be incident on the third face 29 of the glass body 3.

The light incident on the third face 29 passes through the third face 29 and through the light input face 15 of the eyepiece 1 so as to be incident on the confronting face 22a of the eyepiece 1. At the confronting face 22a the light is totally internally reflected so as to be incident on the optical coating 21 of the eyepiece 1 at which the light is partially reflected so as to traverse the air space 23 and enter the eye of the wearer 11 situated at position 9.

Thus, an image of the bright data representation developed by the cathod ray tube 5 is superimposed on the wearer's view of the distant forward scene through the eyepiece 1.

Since the output face 31 of the cathode ray tube 5, at which face 31 the bright data representation is developed, is congruent with the principal focal plane of the coating 21 of the eyepiece 1, the light reflected by the coating 21 which enters the eye of the wearer 11 will be collimated and thus the image of the bright data representation superimposed on the wearer's 11 view of the distant forward scene through the eyepiece 1 will be a virtual image at infinity and therefore parallax free.

The bright data representation could, for example, comprise synthetic data appropriate for head-up display systems.

The bright data representation need not, of course, be developed at the output face 31 of the cathode ray tube 5 but could, particularly where improved collimation is required, for example, be developed at a plane defined by a relay lens interposed between the output face 31 of the cathode ray tube 5 and the glass body 3.

Figure 6:
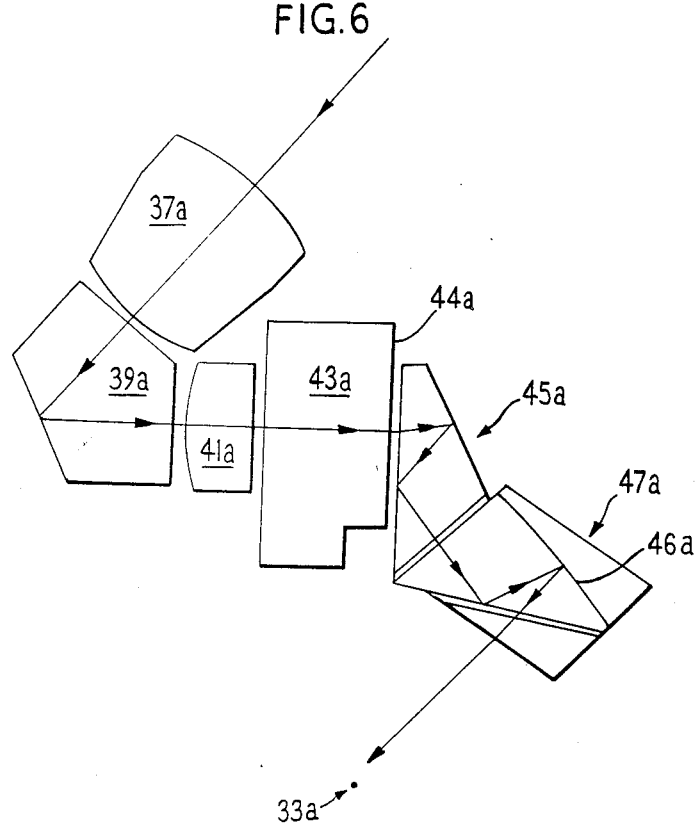
FIG. 6 is an enlarged cross-section of the second system on the line VI—VI in FIG. 5.
Figure 5:
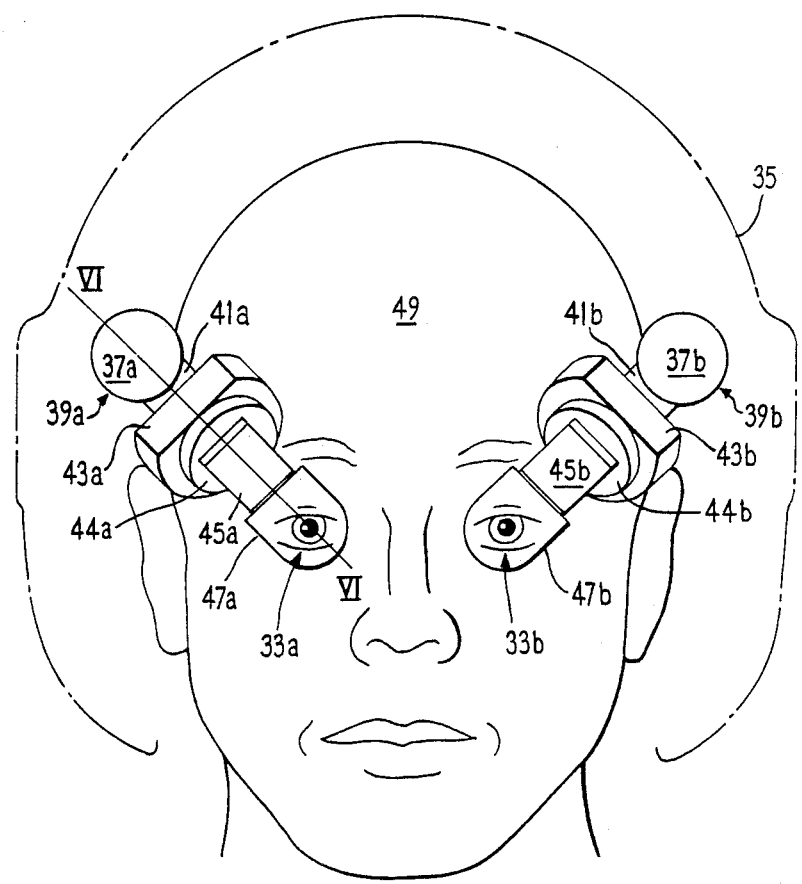
FIG. 5 is a diagrammatic front elevation of the second system.

Referring to FIGS. 5 and 6, the second system comprises in respect of each of two eye positions 33a,33b defined with respect to axes of a helmet 35 supporting the system, a forward looking objective lens 37a,37b, an amici prism 39a,39b, a condenser lens 41a,41b, an image intensifier 43a,43b having an output face 44a,44b, a glass block 45a,45b as the glass block 3 of the first system, and an eyepiece 47a,47b as the eyepiece 1 of the first system. The objective lens 37a,37b and the eyepiece 43a,43b both look forward in directions parallel to one another and the output face 44a,44b of the image intensifier 43a,43b is congruent with the principal focal plane of an optical coating 46a,46b of the eyepiece 43a,43b corresponding to the optical coating 21 of the eyepiece 1 of the first system.

In operation, the lens 37a,37b, prism 39a,39b, lens 41a,41b and intensifier 34a,43b develop a bright data representation of the distant forward scene as seen by the lens 37a,37b at the output face 44a,44b of the intensifier 43a,43b.

The second system thus comprises a night vision system wherein a virtual image at infinity of the bright data representation of the distant forward scene is superimposed on and in register with the view of the wearer 49 of the helmet 35 of the distant forward scene through the eyepieces 43a,43b.

The systems described by way of example exhibit significant improvement compared with comparable prior art systems as regards their all up weights and moments about the helmet wearer's neck pivot position. This improvement arises in part from the presence of the glass body 3 in the first described system and the glass bodies 45a, 45b in the second system. The presence of such a body in a system being found to assist significantly in arriving at a satisfactory design configuration in an ergonomic manner.

It will be understood that requirement for a low all up weight and low moment about neck pivot position arises particularly in the context of a combat aircraft where the wearer of a helmet system according to the invention is likely to be subject to high accelerations.

What is claimed is:

1. A helmet supported optical system which provides an eye of a wearer of a helmet with a direct view of the scene forward of the wearer on which is superimposed collimated optical imagery, said system comprising: an eyepiece comprising a body of light refractive material, supported with respect to the helmet in front of a position for said eye defined with respect to helmet axes, having: a light input face; a boundary surface opposite said input face; substantially flat and parallel fore and aft faces; and, internally of said body bridging the space between said input face and said boundary surface, an aerially extensive region concavely curved towards said aft face and possessing both light reflective and light transmissive properties; and means supported with respect to the helmet operable to develop a bright data representation at a plane substantially congruent with the principal focal plane of said aerially extensive region and defined with respect to said input face of the eyepiece such that light from said bright data representation developed at said plane entering said eyepiece at said input face is: internally reflected forwardly toward said aerially extensive region; partially reflected by said aerially extensive region rearwardly towards said aft face; and transmitted through said aft face to the said position for said eye, wherein between said means operable to develop said bright data representation and said input face of the eyepiece, there is a second body of light refractive material having: a first face by way of which light from said bright data representation can enter said second body; a second face having a mirror coating; and a third face confronting said input face of the eyepiece, the conformation of said second body of light refractive material being such that rays from said bright data representation entering said second body at said first face are: reflected at the mirror coating on said second face back to the said first face such that they are incident on said first face at angles greater than the critical angle of said second body to air; are totally internally reflected at said first face to said third face; and transmitted through said third face to said input face of the eyepiece.

2. A system according to claim 1 wherein said means operable to develop said bright data representation comprises a cathode ray tube, the plane at which said bright data representation is developed being at the output face of said cathode ray tube.

3. A system according to claim 1 wherein said means operable to develop said bright data representation comprises: a forward looking object lens; an image intensifier; and, defining the optical path from said lens to an input face of said intensifier, an amici prism, the system being such that a collimated intensified image of said scene forward of the wearer is presented to said eye of the wearer in register with said direct view through said eyepiece, said plane being at an output face of said image intensifier.

4. A system according to claim 1 wherein said first face is positioned parallel to and in close proximity with said plane.

5. A system according to claim 1 wherein said second and third faces are inclined at acute angles to said first face.

6. A system according to claim 5 wherein said second and third faces are inclined at an obtuse angle to one another.

* * * * *